(12) United States Patent
Frost et al.

(10) Patent No.: US 7,967,686 B2
(45) Date of Patent: Jun. 28, 2011

(54) LONGITUDINAL DRIVE SHAFT FOR MOTOR VEHICLES

(75) Inventors: Sebastian Frost, Bindfelde (DE); Christian Korotwa, Madgeburg (DE); Gerald Langer, Buelstringen (DE)

(73) Assignee: IFA-Technologies GmbH, Haldensleben (DE)

( * ) Notice: Subject to any disclaimer, the term of this patent is extended or adjusted under 35 U.S.C. 154(b) by 0 days.

(21) Appl. No.: 12/807,691

(22) Filed: Sep. 10, 2010

(65) Prior Publication Data

US 2011/0009200 A1 Jan. 13, 2011

Related U.S. Application Data

(62) Division of application No. 11/998,887, filed on Dec. 3, 2007, now abandoned.

(30) Foreign Application Priority Data

Dec. 22, 2006 (DE) .......................... 10 2006 060 879

(51) Int. Cl.
*F16D 3/227* (2006.01)

(52) U.S. Cl. ........................................ 464/146; 464/906

(58) Field of Classification Search .................... 464/15, 464/146, 167, 906; 280/777; 180/384
See application file for complete search history.

(56) References Cited

U.S. PATENT DOCUMENTS

| | | | | |
|---|---|---|---|---|
| 4,202,184 | A * | 5/1980 | Krude et al. | 464/146 |
| 5,582,546 | A | 12/1996 | Welschof | |
| 6,171,196 | B1 | 1/2001 | Welschof | |
| 6,379,255 | B1 | 4/2002 | Cermak et al. | |
| 6,585,601 | B2 | 7/2003 | Booker et al. | |
| 7,674,183 | B2 | 3/2010 | Lutz et al. | |
| 2003/0008716 | A1 | 1/2003 | Boutin | |
| 2003/0127908 | A1* | 7/2003 | Lyon et al. | |
| 2003/0171154 | A1 | 9/2003 | Farrace et al. | |

FOREIGN PATENT DOCUMENTS

| | | |
|---|---|---|
| DE | 42 24 201 | 1/1994 |
| DE | 43 44 177 | 2/1995 |
| DE | 196 52 100 | 4/1998 |
| DE | 199 43 880 | 6/2001 |
| DE | 103 57 858 | 7/2005 |

OTHER PUBLICATIONS

English translation of International Preliminary Report on Patentability.

* cited by examiner

*Primary Examiner* — Greg Binda
(74) *Attorney, Agent, or Firm* — Collard & Roe, P.C.

(57) ABSTRACT

A longitudinal drive shaft for motor vehicles, for transferring a torque, consists of two or more shaft sections which are connected with one another by way of an intermediate shaft or a journal. The intermediate shaft or the journal is the carrier of a center bearing and is connected to the shaft section by a homokinetic displacement joint rigidly disposed in a pipe. The parts of the center bearing and shaft sections that are displaced in a crash are configured to be smaller than the inside diameter of the pipe. The inside diameter of the outer joint ring is greater than the outside diameters of the roller bearing of the center bearing and of the pipe. The homokinetic displacement joint is sealed off with a sealing cap and a sealing bellows in the direction of the shaft section, and has a closure lid assigned to it.

4 Claims, 2 Drawing Sheets

LONGITUDINAL DRIVE SHAFT FOR MOTOR VEHICLES

CROSS REFERENCE TO RELATED APPLICATIONS

This application is a divisional application of U.S. patent application Ser. No. 11/998,887 filed Dec. 3, 2007 now abandoned, which claims priority under 35 U.S.C. §119 on German Application No. 10 2006 060 879.8 filed Dec. 22, 2006.

BACKGROUND OF THE INVENTION

1. Field of the Invention

The invention relates to a longitudinal drive shaft for transferring a torque in motor vehicles, consisting of two or more shaft sections and a joint, in which the shaft sections are connected by an intermediate shaft or a journal.

2. The Prior Art

Such longitudinal drive shafts are generally known and serve to transfer a torque and are configured so that in a frontal collision or a crash in the longitudinal direction of the vehicle, the longitudinal shaft shortens in the axial direction, in order to prevent bending out and penetration into the interior of the vehicle. At the same time, injuries to passengers are precluded to the greatest possible extent. A longitudinal drive shaft for motor vehicles of the type described above has become known from German Patent No. DE 43 44 177 C1.

This longitudinal drive shaft for motor vehicles has an intermediate joint that is configured as an axially displaceable ball rotary joint and consists of at least one outer joint part having first ball raceways that run longitudinally, an inner joint part having second ball raceways that run longitudinally, and balls that transfer torque and are each guided in first and second ball raceways that lie radially opposite one another. In this connection, the outer joint part is rigidly connected with the tubular shaft, and the inner joint part is rigidly connected with the shaft journal. The inside diameters of the outer joint part or of the subsequent tubular shaft, subsequent to the free space taken up by the inner joint part in operation, in the case of pushing movements, in the direction towards the tubular shaft, are configured to be smaller than the outside diameter of the inner joint part.

With this configuration, the result is supposed to be achieved that in case of a "crash," energy is reduced or absorbed by the longitudinal shaft, by means of friction and widening of the parts of the drive shaft that are displaced into one another. It is a disadvantage, however, that bending out of the longitudinal drive shaft can take place as a result of forces acting during the crash.

Another solution of this type is described in German Patent No. DE 42 24 201 C2, with which a longitudinal shaft in the drive train of a motor vehicle is configured so that the other parts of the longitudinal shaft remain undamaged by means of a connection between the inner joint part and the shaft journal, which connection is releasable at a predetermined axial force in the drive train. For this purpose, axial stopping means are provided for the inner joint part, in the outer joint part, on which means the inner joint part is supposed to support itself when the connection between the inner joint part and the shaft journal is released, and the shaft journal is subsequently pushed through the inner joint part.

In the same way, support is supposed to take place by an introduction cone in the outer joint part, or in a bottom part that follows it and is connected with the outer joint part. It is emphasized as being particularly advantageous that a targeted axial force, deviating from zero in a positive manner, having controlled energy absorption, can be adjusted by the means for absorbing friction work or deformation work when the shaft journal is axially pushed through the inner joint part and into the introduction cone.

This solution also has the disadvantage that in the case of an accident, this longitudinal drive shaft can also bend out and penetrate into the passenger space, which can lead to injuries to the persons situated in the passenger space. Furthermore, the maximal length of the crash path is very disadvantageous in the case of this variant, since the shaft journal cannot be selected to have simply any desired length, because in the case of a shaft journal having a greater length, bending-critical speeds of the rotation of the longitudinal shaft occur, which also have a disadvantageous effect on the stability system of a longitudinal shaft configured in such a manner.

Furthermore, German Patent No. DE 199 43 880 C1 describes a drive arrangement with a longitudinal drive shaft and an intermediate bearing, which are used in motor vehicles.

This longitudinal drive shaft consists of a first shaft section having a first joint, a second shaft section having a second joint, and a third joint in the form of a homokinetic fixed joint, which connects the first shaft section and the second shaft section, and comprises the intermediate bearing, which is assigned to the first shaft section, and adjacent to the fixed homokinetic joint, a roller bearing. With this drive arrangement, the smallest inside diameters of the outer joint part, of the second shaft pipe, of the outer joint part of the joint, and of the shaft pipe that belongs to the second shaft section, are greater than the greatest outside diameters of the first shaft section and of the roller bearing of the intermediate bearing.

With this arrangement, it is supposed to be possible for the two shaft sections to move into one another in the manner of a telescope, essentially without force, if the maximally permissible displacement path of the first joint and of the second joint, in the axial direction, is exceeded, for example due to a frontal impact of the vehicle.

By means of the different dimensions of the functional parts of the drive arrangement, in order to be able to telescope them, it is guaranteed that these parts will be pushed into one another, but significant force effects are required to initiate this process of telescoping, and again it cannot be precluded that the longitudinal drive shaft bends out.

SUMMARY OF THE INVENTION

The invention is therefore based on the task of further developing a longitudinal drive shaft for motor vehicles, in such a manner that in the case of a crash, the individual function-determining components of the longitudinal drive shaft can be pushed into one another, and uncontrolled bending out of the shaft sections of the drive shaft is avoided.

This task is accomplished, according to the invention, by a longitudinal drive shaft for motor vehicles, which serves to transfer a torque and consists of two or more shaft sections that are connected with one another by way of an intermediate shaft or a journal, which in turn are rigidly connected with a shaft section.

The connection takes place by way of a homokinetic displacement joint disposed with the first shaft section, into the ball hub of which the intermediate shaft/the journal is fitted. On the opposite side, the intermediate shaft is mounted in a sleeve that is rigidly connected with the rotor of the second shaft section.

A center bearing provided between the two shaft sections is structured and configured in such a manner that the intermediate shaft, or, if a journal is used, are the carriers of the center bearing.

The second shaft section of the longitudinal drive shaft as well as the center bearing, here the roller bearing of the center bearing, are dimensioned and configured so that they can telescope into the interior of the first shaft section in the case of a frontal impact, a crash, and thus it is assured that the entire longitudinal drive shaft and also individual partial pieces of it no longer bend out.

The homokinetic displacement joint disposed in the first shaft section is rigidly connected with the outer pipe of the first shaft section, and the outer joint ring and the ball hub of the homokinetic displacement joint are configured with ball grooves on their inner and outer wall, respectively, in which balls are disposed, so that they are guided and run around.

When a journal is used in place of an intermediate shaft, the journal is connected towards the first shaft section with the homokinetic displacement joint, and rigidly connected towards the second shaft section directly with the second shaft section. This can take place by means of a weld, for example.

The journal is configured, in the direction of the second shaft section, with the greatest outside diameter that is adapted to the outside diameter of the pipe of the second shaft section, and a rigid connection is achieved by means of welding.

The homokinetic displacement joint is sealed off from the atmosphere, on the one side, by means of a sealing cap and a sealing bellows, and provided with a closure lid on the opposite side. This lid prevents foreign bodies from penetrating into the interior of the homokinetic displacement joint, which cause contamination and therefore disruptions in operation. At the same time, the lubricant cannot exit from the interior of the homokinetic displacement joint.

This closure lid not only prevents exit of lubricant and entry of harmful substances into the homokinetic displacement joint, but also is configured as a safety element, which possesses planned breaking points that are destroyed in the event of an accident, and guarantees free telescoping of the one shaft section into the other.

The closure lid is configured as a funnel-shaped molded part, possesses an outer collar with a subsequent guidance bevel, which makes a transition into the cylindrical part of the closure lid, which is closed off on the end side by means of the planar part.

The planned breaking points of the closure lid are formed by the attachment of the closure lid to the first shaft section or to the inner wall of the pipe of the first shaft section, or, in a further embodiment, in the region of the transition from the cylindrical part of the closure lid to the planar part.

Aside from the function of sealing the homokinetic displacement joint and forming planned breaking points, the closure lid acts as a guide element, in the case of a crash, in such a manner that the telescoped parts, the intermediate shaft or the journal, the roller bearing of the center bearing, and the balls, the cage, as well as the ball hub of the homokinetic joint, are guided in the cylindrical part of the closure lid.

In this connection, it is advantageous that the homokinetic displacement joint breaks down into its individual parts almost without force, and that the planned breaking points lie outside of the displacement joint, so that aside from the destruction of the lid, unhindered telescoping of the functional parts that are displaced in the case of the crash is made possible. This has a positive effect on the entire telescoping process, in its totality.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
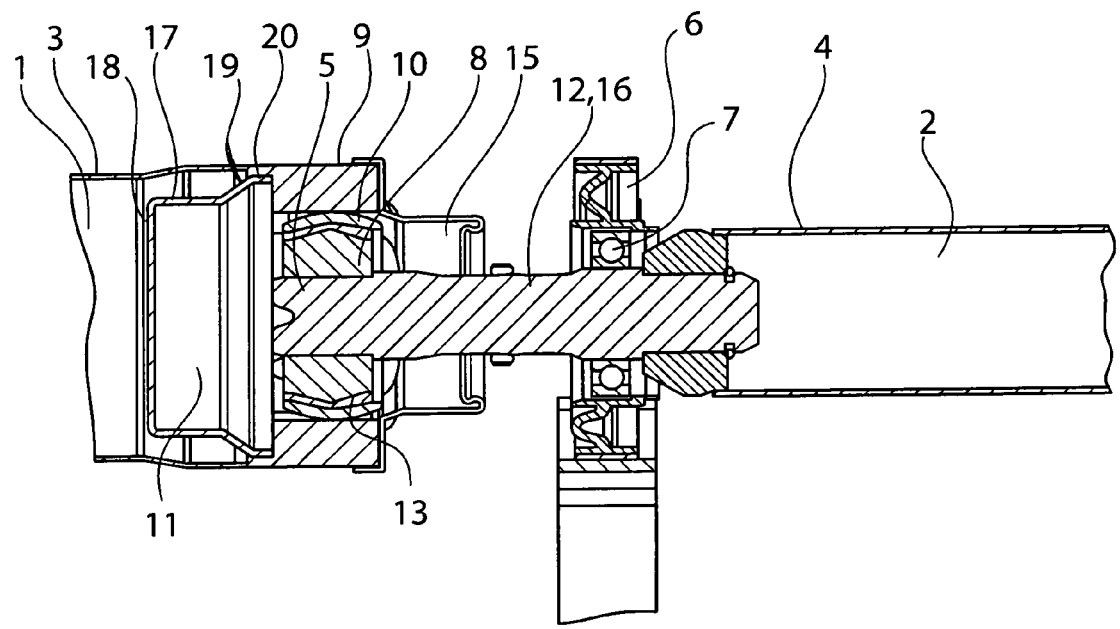
FIG. 1 shows one embodiment of the longitudinal drive shaft in the operating state.

The configuration of one embodiment of the longitudinal drive shaft is shown in FIG. 1, in a fundamental representation. This consists of a first and second shaft section 1, 2, which each consist of a pipe 3 and 4, which are connected with one another by way of an intermediate shaft 12 or configured as journals 16. The center bearing 6 is provided between the two shaft sections 1, 2; its roller bearing 7 is provided on intermediate shaft 12, to provide support, or, if a journal 16 is used, on the latter.

In the following, reference will only be made to an intermediate shaft. First shaft section 1 consists of pipe 3, in which or towards which homokinetic displacement joint 5 is disposed.

Homokinetic displacement joint 5 consists of a ball hub 8 that is disposed on intermediate shaft 12, an outer joint ring 9, a cage 10, and ball grooves, not shown in any detail, which are provided in outer joint ring 9 and ball hub 8, in which balls 13 run.

On the right side, homokinetic displacement joint 5 is sealed off with a sealing cap 15 and a sealing bellows, not shown in detail, and on the left side of homokinetic displacement joint 5, a closure lid 11 that functions as a securing element for the joint is provided.

Closure lid 11 is produced from a thin-walled material, for example a metal sheet, and configured as a shaped part. It consists of an outer circumferential collar 20 and a cylindrical part 17, which are connected with one another by a guidance bevel 19.

The end side of closure lid 11 is configured with a planar part 18, which seals off closure lid 11, and, in the installed state, homokinetic displacement joint 5.

From FIG. 1, it is evident that closure lid 11 is connected with outer joint ring 9 of homokinetic displacement joint 5. This connection point represents a first planned breaking point 14, whose task it is to perform its function in the case of a crash, which means that here, the connection between closure lid 11 and homokinetic displacement joint 5 is dissolved or cancelled out, in order to allow telescoping of second shaft section 2 into first shaft section 1. Parts of the center bearing 6 and the second shaft section 2 that are displaced during a crash are configured to be smaller than an inside diameter of the pipe 3, and an inside diameter of the outer joint ring 9 is greater than outside diameters of the roller bearing 7 and of pipe 4.

Figure 2:
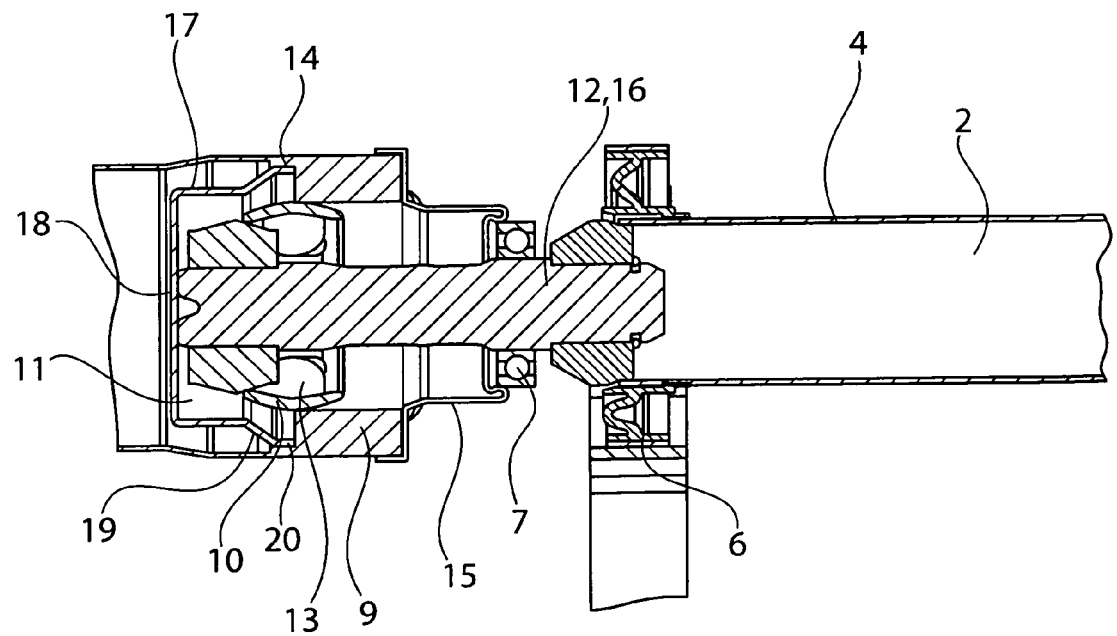
FIG. 2 shows the longitudinal drive shaft in a first crash position.

A first position of the displacement of shaft section 2 in the direction of homokinetic displacement joint 5 is shown in FIG. 2, from which it is also evident that shaft section 2 was already pushed so far to the left that roller bearing 7 was pressed out of center bearing 6, and the intermediate shaft as well as the ball hub bump against or come to lie against closure lid 11. During the displacement, an axial stress also occurred on homokinetic displacement joint 5, with the consequence that the ball hub 8 has moved out of outer joint ring 9 by a certain part, and intermediate shaft 12 has come to lie against the inside of the planar part of closure lid 11.

In this position, the connection between closure lid 11 and homokinetic displacement joint 5 still exists, as documented by the planned breaking point indicated with the number 14 in FIG. 2.

When shaft section 2 penetrates further into homokinetic displacement joint 5, and subsequently, into the interior of pipe 3, planned breaking point 14 performs its function, in that the connection between closure lid 11 and homokinetic displacement joint 5 is interrupted.

Figure 3:
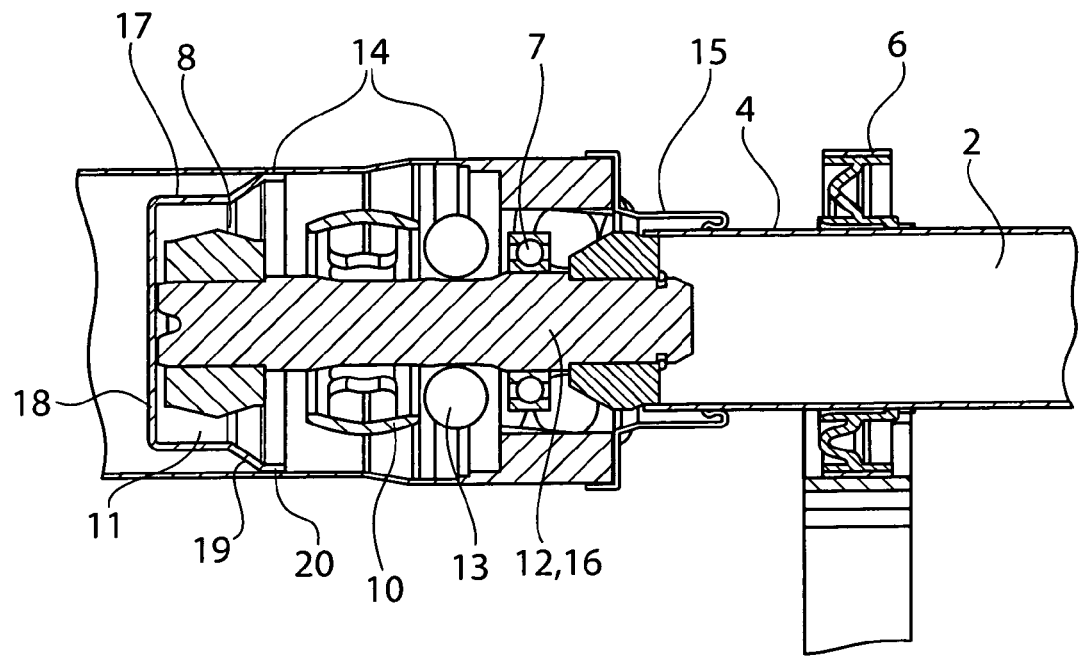
FIG. 3 shows the longitudinal drive shaft in another crash position, with the first planned breaking point becoming active.

FIG. 3 already shows the position in which telescoping of shaft section 2 into shaft section 1 has proceeded to such an extent that balls 13 have also exited from cage 10, and are situated in the intermediate space between ball hub 8 and roller bearing 7 and thus cage 10.

Figure 4:
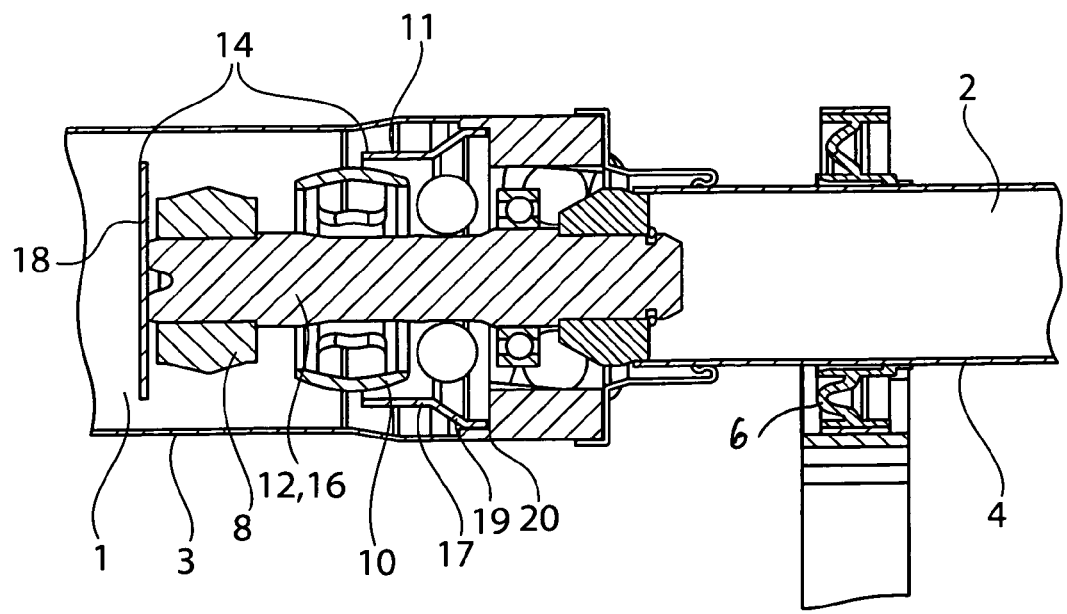
FIG. 4 shows the longitudinal drive shaft in yet another crash position, with the second planned breaking point becoming active.

From FIG. 3, it is also evident how closure lid 11 fulfills its guidance task, in that closure lid 11 slides along the inner wall of pipe 3 by way of its outer collar 20, and thus imparts guidance to the telescoping functional elements, and bending out of the longitudinal drive shaft is prevented. Closure lid 11 guides the telescoping components into the interior of pipe 3 during a crash. Guidance bevel 19 is configured as an introduction cone. FIG. 4 shows the second planned breaking point 114 of closure lid 11 going into effect. Here, closure lid 11 is configured in such a manner that planned breaking point 114 lies in the region of the transition from cylindrical part 17 to planar part 18, and destruction of closure lid 11 also takes place at this point, as is evident from FIG. 4.

In this connection, this planned breaking point 114 is dimensioned in such a manner that ball hub 8 does not press the entire closure lid 11 out of outer joint ring 9 of homokinetic displacement joint 5, but rather ball hub 8 punches out the front part, planar part 18 of closure lid 11, in the broadest sense, thereby the path is cleared for further displacement of the telescoping components. Here, cylindrical part 17 of closure lid 11 takes over the function of guiding these parts.

Accordingly, while only a few embodiments of the present invention have been shown and described, it is obvious that many changes and modifications may be made thereunto without departing from the spirit and scope of the invention.

What is claimed is:

1. A longitudinal drive shaft for motor vehicles, for transferring a torque, comprising:
    at least two shaft sections comprising a first shaft section and a second shaft section;
    an intermediate shaft or a journal connecting the two shaft sections to each other;
    a center bearing having a roller bearing and being carried by the intermediate shaft or journal;
    a homokinetic displacement joint rigidly disposed in a pipe of the first shaft section for connecting the intermediate shaft or journal to the first shaft section, said joint comprising an outer joint ring, a ball hub, balls which run guided in ball grooves of the outer joint ring and ball hub, and a cage;
    a sealing cap and a sealing bellows for sealing the joint in a direction of the second shaft section, and
    a closure lid assigned to the joint and configured as a guidance and securing element, said lid being disposed towards the first shaft section and projecting into an interior of the pipe of the first shaft section, wherein the closure lid is a shaped part produced from a thin-walled material, and consists of an attachment collar, a cylindrical part, a planar part, and a guidance bevel, and is configured with planned breaking points, and a transition point from the cylindrical part to the planar part of the closure lid is configured as one of the planned breaking points;
    wherein parts of the center bearing and the second shaft section that are displaced during a crash are configured to be smaller than an inside diameter of the pipe of the first shaft section, and
    wherein an inside diameter of the outer joint ring is greater than outside diameters of the roller bearing and of a pipe of the second shaft section.

2. A longitudinal drive shaft according to claim 1, wherein the closure lid is connected with the outer joint ring.

3. A longitudinal drive shaft according to claim 1, wherein the two shaft sections are connected by a journal, and wherein the journal is configured with an enlarged outer diameter on one side, which corresponds to a diameter of the pipe of the second shaft section, and wherein the journal is rigidly welded to the pipe of the second shaft section.

4. A longitudinal drive shaft for motor vehicles, for transferring a torque, comprising:
    at least two shaft sections comprising a first shaft section and a second shaft section;
    an intermediate shaft or a journal connecting the two shaft sections to each other;
    a center bearing having a roller bearing and being carried by the intermediate shaft or journal;
    a homokinetic displacement joint rigidly disposed in a pipe for connecting the intermediate shaft or journal to the first shaft section, said joint comprising an outer joint ring, a ball hub, balls which run guided in ball grooves of the outer joint ring and ball hub, and a cage;
    a sealing cap and a sealing bellows for sealing the joint in a direction of the second shaft section, and
    a closure lid assigned to the joint and configured as a guidance and securing element, said lid being disposed towards the first shaft section and projecting into an interior of the pipe, wherein the closure lid is a shaped part produced from a thin-walled material, and consists of an attachment collar, a cylindrical part, a planar part, and a guidance bevel, and is configured with planned breaking points;
    wherein parts of the center bearing and the second shaft section that are displaced during a crash are configured to be smaller than an inside diameter of the pipe,
    wherein an inside diameter of the outer joint ring is greater than outside diameters of the roller bearing and of the pipe, and
    wherein the cylindrical part of the closure lid guides components that telescope into the interior of the pipe during a crash, and wherein the guidance bevel is configured as an introduction cone.

* * * * *